United States Patent [19]

Ando

[11] Patent Number: 4,983,980
[45] Date of Patent: Jan. 8, 1991

[54] SATELLITE RADIO SIGNAL TRACKING METHOD FOR GPS RECEIVERS

[75] Inventor: Hitoshi Ando, Saitama, Japan

[73] Assignee: Pioneer Electronic Corporation, Tokyo, Japan

[21] Appl. No.: 549,514

[22] Filed: Jul. 6, 1990

[30] Foreign Application Priority Data

Nov. 2, 1989 [JP] Japan ................................ 1-284820

[51] Int. Cl.$^5$ .............................................. G01S 1/00
[52] U.S. Cl. .................................... 342/357; 364/449; 342/457; 455/12
[58] Field of Search ............... 364/449, 453, 450, 451, 364/456, 459; 340/995; 342/356, 357, 457, 359, 352, 420, 422; 455/12, 13

[56] References Cited

U.S. PATENT DOCUMENTS

| 4,445,118 | 4/1984 | Taylor et al. | 342/357 |
| 4,468,793 | 8/1984 | Johnson et al. | 342/357 X |
| 4,731,613 | 3/1988 | Endo et al. | 364/450 X |
| 4,928,107 | 5/1990 | Kuroda et al. | 364/449 X |
| 4,949,268 | 8/1990 | Nishikawa et al. | 342/457 X |

Primary Examiner—Thomas H. Tarcza
Assistant Examiner—Tod Swann
Attorney, Agent, or Firm—Sughrue, Mion, Zinn, Macpeak & Seas

[57] ABSTRACT

A vehicle-mounted GPS receiver for positioning and reckoning being capable of tracking satellite signals without serious interruption when passing through a dead zone such as a tunnel by quick recapturing of satellite signals after the vehicle has cleared the dead zone, wherein the GPS receiver determines, by calculation, one GPS satellite which is at the maximum elevation angle among the GPS satellites at the very moment if the satellite signals have interrupted simultaneously over a specified period of time, and starts to track the determined GPS satellite as soon as the vehicle clears the dead zone, whereas the GPS receiver calculates orbital positions of other GPS satellites required for positioning, two dimensional or three dimensional, based on the orbital position of the GPS satellite which is at the highest elevation angle, further, when the GPS receiver has a plurality of receiving channels, a plurality of GPS satellites are assigned, one by one, to the plurality of receiving channels from the highest elevation angle in due order for reducing the time in recapture.

3 Claims, 3 Drawing Sheets

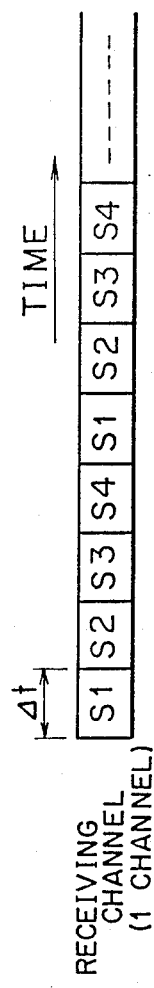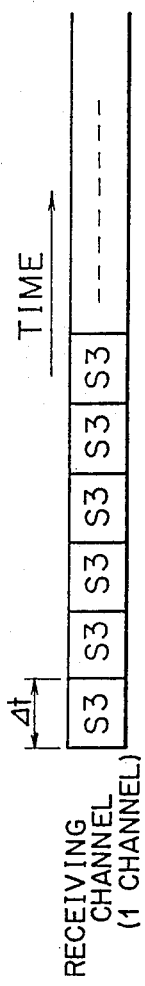

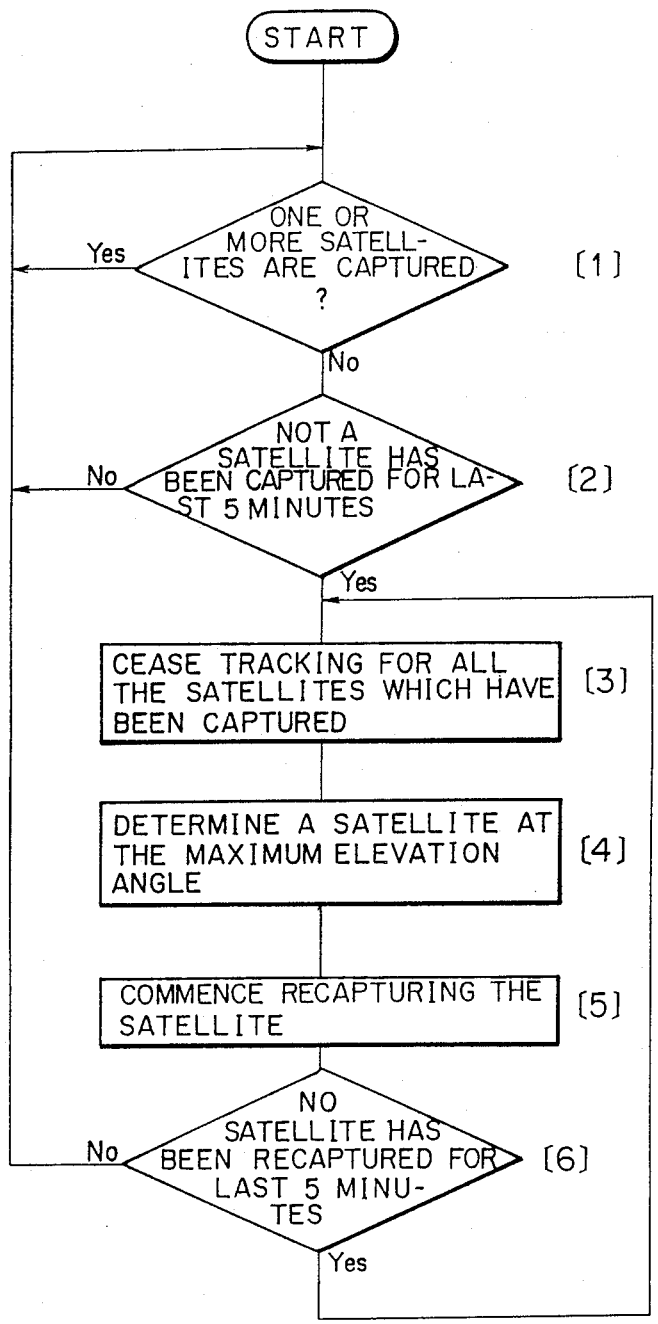

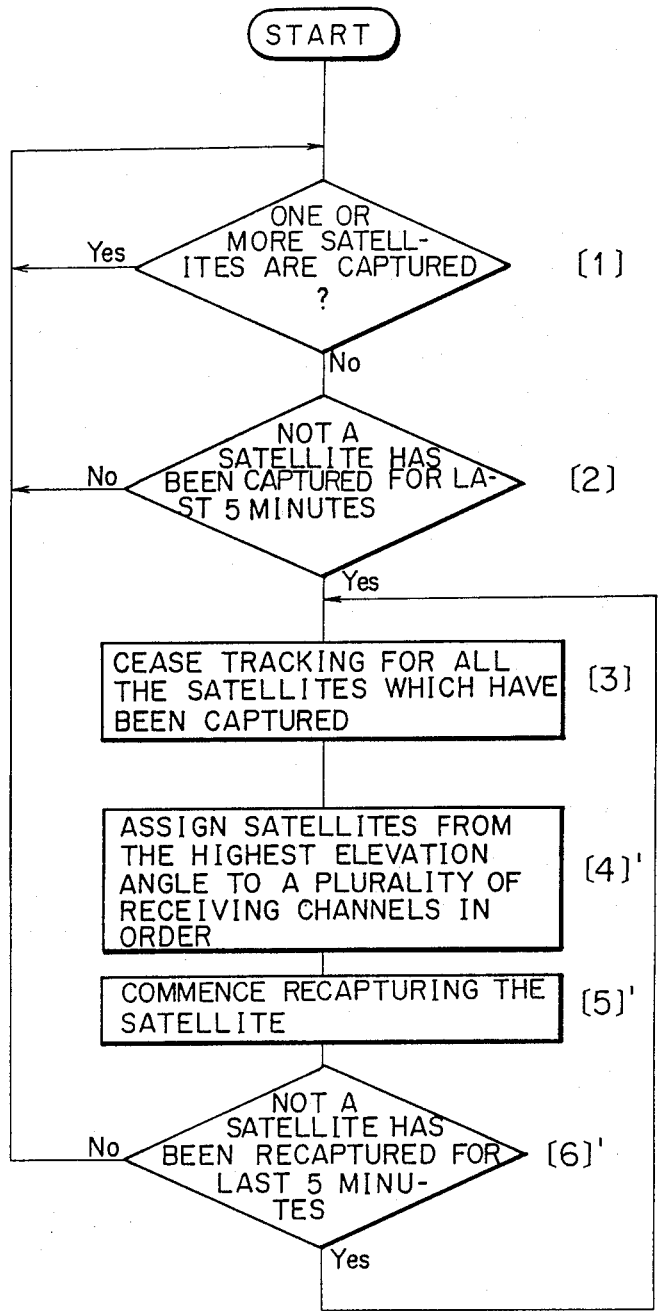

SATELLITE RADIO SIGNAL TRACKING METHOD FOR GPS RECEIVERS

BACKGROUND OF THE INVENTION

1. Field of the Invention

The present invention relates to a method of tracking satellite radio signals for Global Positioning System (GPS) receivers.

2. Description of the Prior Art

Positioning systems currently in service utilizing artificial satellites include a so-called Global Positioning System (GPS). This positioning system, as the name implies, will cover the entire surface of the globe by a total of 24 geodetic satellites when all of them are operational on six orbits, about 20,200 km above the Earth, which will accommodate four geodetic satellites each. Each geodetic satellite transmits a GPS signal containing navigation data for reckoning to the Earth using a spread-spectrum system. The reckoning is carried out on the ground, on the sea as well as in the air by receiving GPS signals from a plurality of geodetic satellites, for example, by receiving GPS signals from three geodetic satellites for two-dimensional positioning and those from four of them for three-dimensional positioning. In this way, based on the navigation data contained in the GPS signal from each geodetic satellite, position information on the receiving point such as a latitude, longitude and altitude thereof can be reckoned in real-time.

This GPS system was originally developed for U.S. military use, however a part of the GPS signal (C/A code) has been made available for civil applications. Therefore, it is possible to build navigation systems for automobiles, ships and aircraft by using the GPS signal.

The above GPS system, however, has a drawback. Since the GPS satellites are not geostationary satellites, the frequency of the GPS signal may be shifted due to the Doppler effect when received by a GPS receiver. Thus, the GPS receiver must start receiving of the spread-spectrum signal from the satellite by locking a phase-locked loop (PLL) circuit of the receiver to a frequency of the GPS signal which may be shifted by the Doppler effect. Upon locking of the PLL circuit, the spread-spectrum signal is despread and demodulated to receive the GPS signal. For this reason, it is theoretically impossible to commence the receiving of the satellite signals immediately even when the signals have already arrived at the GPS receiver.

When the GPS system is employed for vehicle navigation systems, the GPS receiver cannot discriminate between a situation wherein the GPS signal is not received due to the PLL circuit remaining unlocked or the GPS signal failing to be despread under the presence of the satellite signal and a situation wherein the GPS signal is not received because the signal itself is not reaching the receiver as when the vehicle is in a tunnel. Therefore no appropriate steps can be taken on the part of the GPS receiver when the vehicle is in a tunnel where no satellite signals are received. This means that after the vehicle has passed through the tunnel, it takes time for the GPS receiver to reestablish the contact with the satellite, resulting in no reckoning being performed for certain period of time and thus causing a problem for the driver.

In case of adopting the GPS system in a vehicle-mounted navigation equipment, in view of balancing the reckoning accuracy and the production cost, a GPS receiver having a small channel capacity of covering only one or two channels is utilized and thereby a time-division multiple-access system is employed to allow the GPS receiver to receive signals from a plurality of GPS satellites in a sequential manner with a single channel. However, in such a system, it takes considerable time for the GPS receiver to reestablish the contact with the satellite.

It is an object of the invention to eliminate the aforesaid problems and to provide a satellite signal tracking method for GPS receivers using a time-division multiple-access system, which enables the GPS receiver to pick up satellite signals as soon as the signal reception is recovered to the normal condition after the reception of the satellite signals has been lost, for example, within a tunnel and the like.

SUMMARY OF THE INVENTION

A satellite radio signal tracking method for GPS receivers, in which a receiving channel is multiplexed by employing a time-division multiple-access system to receive satellite signals sequentially from a plurality of GPS satellites, comprising the steps of: releasing the GPS receiver from time-division multiple-access reception when satellite signals from all the satellites in reception are lost simultaneously over a specified duration of time; and changing the receiving mode so as to chase only one GPS satellite which is at the maximum estimated angle of elevation at that moment.

In case the GPS receiver has multiple receiving channels, these channels are assigned, on a one-to-one basis, with satellites beginning with the highest elevation angle in descending order.

The higher the angle of elevation of the satellite, the less likely the GPS receiver is to be obstructed by obstacles such as buildings and trees and the better the sight to the satellite from the ground. That is, as the angle of elevation increases, it becomes easier to chase the satellite.

If the reception of satellite signals is interrupted for more than a certain period of time, for example, when the vehicle enters a tunnel, it is decided that the GPS receiver has entered into a dead zone for signal reception, and the GPS receiver predicts a satellite which may have the maximum angle of elevation at the very moment and tries to chase only the predicted satellite. This allows the GPS receiver to quickly receive satellite signals as soon as the vehicle comes out of the tunnel, reestablishing the contact with the satellite.

When one satellite is recaptured in the way mentioned above, it is possible to know the accurate positions of all other satellites in their orbits by using the almanac information of the recaptured satellite. This in turn permits the GPS receiver to locate other satellites required for the reckoning again.

BRIEF DESCRIPTION OF THE DRAWINGS

FIG. 1 is a timing diagram showing an embodiment of this invention and illustrating an operation of recapturing a GPS satellite with the GPS receiver having a single receiving channel;

FIG. 2 is a flowchart showing a sequence of operational steps performed by the GPS receiver of the type shown in FIG. 1; and FIG. 3 is a flowchart showing a sequence of operations as performed by a GPS receiver having a plurality of receiving channels.

PREFERRED EMBODIMENTS OF THE INVENTION

Some preferred embodiments of the invention will be described by referring to the attached drawings.

FIG. 1 shows one embodiment of this invention illustrating a satellite signal recaptured by a GPS receiver having a single receiving channel. FIG. 2 is a flowchart showing the operational steps performed by the GPS receiver having a single receiving channel.

Assuming that the vehicle is traveling in an open area, the GPS receiver receives satellite signals from four satellites S1 to S4, which are needed for three-dimensional positioning, by time-division multiplexing within a single receiving channel at a predetermined sampling interval of $\Delta t$ in a sequential manner, as shown in FIG. 1A (step [1] in FIG. 2).

When the vehicle enters a tunnel and the GPS receiver receives no signal from any of the satellites for more than a specified period of time, for example, more than five minutes (step [2]), it is decided that the vehicle has entered a dead zone like a tunnel for satellite signal reception, and the operation for tracking the four satellites S1 to S4 is stopped (step [3]) in the GPS receiver. At the same time, the GPS receiver calculates which satellite is expected to be at the highest angle of elevation at the very moment (step [4]).

In order to determine the satellite at the maximum elevation angle, there needs to be: (1) a clock having a time with no substantial deviation from the GPS time (the deviation should be within 10 minutes); (2) approximate position information not much different from the current position (if the position is within Japan, for example, the position of Tokyo may be appropriate); and (3) almanac information which can be used for estimating current positions of the GPS satellites. As for the time in item (1), a clock unit installed in the GPS receiver or a built-in clock of the vehicle can be used. Regarding the position information of item (2), it is enough to store the latitude and longitude of Tokyo, for instance, in a ROM (read-only memory) installed in the GPS receiver. As to the almanac information for each satellite of item (3), the almanac information of each GPS satellite that was received before losing the signal reception can be used. By utilizing these information, it is possible to predict the positions of all satellites by making use of the known satellite orbit calculating algorithm, and thereby to determine the satellite which has the maximum elevation angle at the very moment.

If it is assumed that the satellite having the maximum elevation angle is the satellite S3 (step [4]), the GPS receiver changes the receiving mode so as to track only the satellite S3 at the maximum elevation angle (step [5]).

When the satellite S3 having the maximum elevation angle is recaptured (step [6]), the processing proceeds to step [1] to perform the ordinary sequential tracking operation, that is, choosing, as the tracking targets, the satellite S3 at the maximum elevation angle and three other satellites, which are determined based on the almanac information of the satellites S3 as being most suited for three-dimensional positioning at the very moment, and then starting to receive signals from these four satellites in accordance with an ordinary sequential time-division multiple-access receiving mode.

On the other hand, if the GPS receiver fails to catch the signal from the satellite S3 for more than a predetermined period of time, five minutes in this embodiment (step [6]), the program returns to step [3] to repeat the above-mentioned satellite tracking operational steps.

In the embodiment described above, the GPS receiver has only one receiving channel. For a GPS receiver having a plurality of receiving channels, however, the operational steps shown in the flowchart of FIG. 3 apply. In this case, the same number of satellites as that of the receiving channels are selected beginning with the highest elevation angle in the descending order and are assigned, on a one-to-one basis, to the plurality of receiving channels at step [4']. At step [6'], if none of the satellites assigned to these receiving channels is captured, the program returns to step [3]. The operations performed in other steps are identical with those of FIG. 2.

The advantages of this invention may be summarized as follows. When the signals from all of the satellites being tracked are lost from reception simultaneously for a specified length of time, the GPS receiver is released from the time-division multiple-access reception and the receiving mode is changed to make it possible to chase only one GPS satellite which is calculated to have the maximum elevation angle at the very moment. This enables the receiver to detect the GPS signal from the satellite as soon as it arrives, making it easier to track the satellites again after the vehicle has passed a dead zone like a tunnel where no satellite radio signal reaches. The positioning calculation therefore can be restarted more quickly than by the conventional apparatus of the prior art.

If the GPS receiver has a plurality of receiving channels, these channels are assigned, on a one-to-one basis, with satellites beginning with the one having the highest elevation angle in the descending order, thus resulting in more faster retracking of the satellites.

What is claimed is:

1. In a GPS (Global Positioning System) receiver in which GPS signals from a plurality of GPS satellites are received sequentially through a receiving channel according to a time-division multiple-access system, a method of tracking the satellite signals for the GPS receiver comprising the steps of:

releasing the GPS receiver from time-division multiple-access reception when satellite signals from all the satellites in reception are lost simultaneously over a specified duration of time; and changing the receiving mode so as to track only one GPS satellite which is at the maximum estimated angle of elevation at that moment.

2. A method of tracking the satellite signals for the GPS receiver as claimed in claim 1, wherein the maximum elevation angle of the GPS is calculated based on a present time, a present position of a satellite signal receiving point and an almanac information of each GPS satellite which was in contact.

3. A method of tracking the satellite signals for the GPS receiver as claimed in claim 1, wherein the GPS receiver has a plurality of receiving channels and GPS satellites are assigned, one by one, to the plurality of receiving channels from the highest elevation angle in order.

* * * * *